United States Patent
Shamoto (10) Patent No.: US 6,316,903 B1
(45) Date of Patent: Nov. 13, 2001

(54) SYNCHRONOUS CONTROLLER (75) Inventor: Kousuke Shamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/648,810

(22) Filed: Aug. 28, 2000

Related U.S. Application Data (63) Continuation of application No. PCT/JP98/00810, filed on Feb. 27, 1998.

(51) Int. Cl.⁷ ................................................. H02P 1/46
(52) U.S. Cl. ............................................. 318/700; 318/625
(58) Field of Search ............................... 318/700, 568.22, 318/625, 600, 632

(56) References Cited

U.S. PATENT DOCUMENTS

| | | | |
|---|---|---|---|
| 4,613,800 | * | 9/1986 | Jeppsson ........................ 318/434 |
| 5,157,597 | * | 10/1992 | Iwashita ........................ 364/157 |
| 5,204,602 | * | 4/1993 | Iwashita ........................ 318/630 |
| 5,319,294 | * | 6/1994 | Ohto et al. ..................... 318/568.22 |
| 5,432,422 | * | 7/1995 | Nagano et al. .................. 318/611 |
| 5,568,028 | * | 10/1996 | Uchiyama et al. ................ 318/566 |
| 5,598,077 | * | 1/1997 | Matsubara et al. ............... 318/568.22 |
| 5,637,969 | * | 6/1997 | Kato et al. ..................... 318/432 |
| 5,646,495 | * | 7/1997 | Toyozawa et al. ................ 318/625 |
| 5,659,131 | * | 8/1997 | Kono et al. ..................... 73/104 |

FOREIGN PATENT DOCUMENTS

| | | | |
|---|---|---|---|
| 7-186007 | 7/1995 | (JP) | .............................. B23B/15/20 |
| 6-43191 | 2/1994 | (JP) | .............................. G01R/19/00 |
| 62-20009 | 1/1987 | (JP) | .............................. G05D/3/12 |
| 1-79110 | 5/1989 | (JP) | .............................. G05D/3/12 |
| 2-61706 | 3/1990 | (JP) | .............................. G05D/3/12 |
| 2-110715 | 4/1990 | (JP) | .............................. G05D/3/12 |
| 4-15807 | 1/1992 | (JP) | .............................. G05D/3/12 |
| 9-44253 | 2/1997 | (JP) | .............................. G05D/3/12 |
| 1-138991 | 5/1989 | (JP) | .............................. H02P/5/40 |

* cited by examiner

*Primary Examiner*—Robert E. Nappi
*Assistant Examiner*—Rina I. Duda
(74) *Attorney, Agent, or Firm*—Sughrue, Mion, Zinn, Macpeak & Seas, PLLC (57) ABSTRACT

A synchronous controller that can perform high-speed, high-accuracy torque constant control even in applications wherein rapid load variation exists. The torque amount used for a control purpose of pressing a workpiece, etc., can be set as a torque offset correction amount and the torque offset correction amount is added to a torque command generated based on a speed command and speed feedback generated based on a position command and positions feedback.

7 Claims, 10 Drawing Sheets

SYNCHRONOUS CONTROLLER

This application is a continuation of PCT/NO.JP98/00810 filed Fed. 27, 1998.

BACKGROUND OF THE INVENTION

1. Field of the Invention

This invention relates to a synchronous controller for controlling a servo motor for driving a robot, a machine tool, etc., with constant torque.

2. Description of the Related Art

Figure 8:
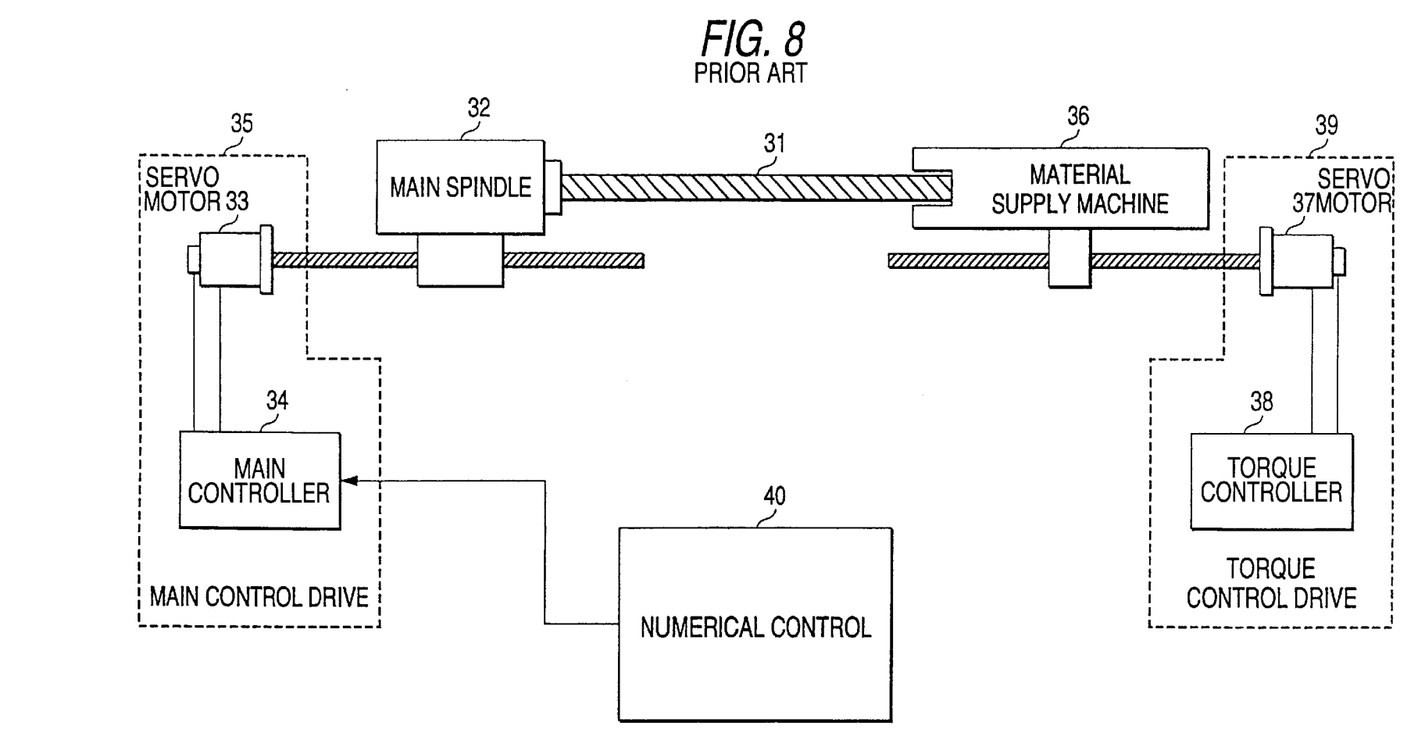
FIG. 8 is a diagram to show the configuration of a torque constant synchronous control system for supplying a workpiece to a main spindle with a material supply machine in a related art.

FIG. 8 is a diagram to show the configuration of a torque constant synchronous control system for supplying a workpiece to a main spindle with a material supply machine in a related art. In the figure, numeral 31 denotes a workpiece, numeral 32 denotes a main spindle for rotating with the workpiece 32 fixed, numeral 33 denotes a main control servo motor, numeral 34 denotes a main controller, numeral 35 denotes a main control drive for performing position control of the main spindle 32 by the main control servo motor 33, numeral 36 denotes a material supply machine for supplying the workpiece 31 to the main spindle 32 and also giving a constant load to the workpiece 31 at the workpiece working time, numeral 37 denotes a torque control servo motor, numeral 38 denotes a torque controller, numeral 39 denotes a torque control drive for controlling the torque control servo motor 37 as constant torque so as to enable the material supply machine 36 to give a constant load to the workpiece 31, and numeral 40 denotes a numerical control for outputting a position command to the main control drive 35.

At the workpiece working time, the main control drive 35 performs axial position control of the main spindle 32 and the torque control drive 39 performs torque constant control so that the material supply machine 36 gives a constant load to the workpiece 31 during the workpiece working time.

In the torque constant synchronous control system in the related art, the main control drive 35 and the torque control drive 39 are controlled separately and as a result of the torque control drive 39 pressing the material supply machine 36 against the workpiece 31 under constant load by performing torque constant control, the main control drive 35 and the torque control drive 39 are operated synchronously.

Figure 9:
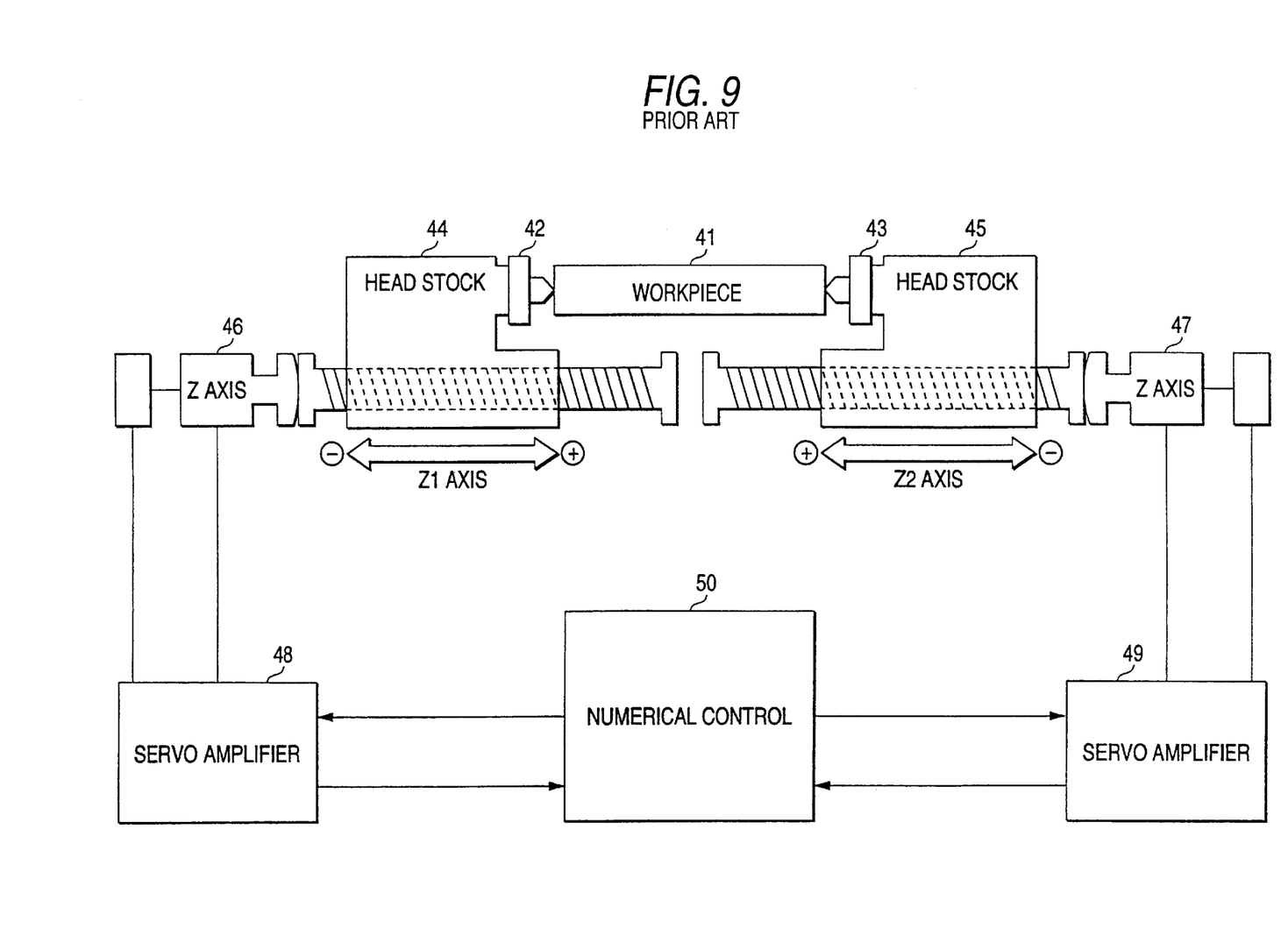
FIG. 9 is a diagram to show the configuration of a complex lathe in a related art for working a workpiece in a state in which the workpiece is caught at both ends thereof, disclosed in JP-A-7-186007.

FIG. 9 is a diagram to show the configuration of a complex lathe in a related art for working a workpiece in a state in which the workpiece is caught at both ends thereof, disclosed in JP-A-7-186007. In the figure, numeral 41 denotes a workpiece, numerals 42 and 43 denote face drivers touching the end face portions of the workpiece 41 in the vicinity of a rotation axis, numerals 44 and 45 denote head stocks on which a main spindle is mounted, numerals 46 and 47 denote Z-axis servo motors for driving the head stocks 44 and 45, numerals 48 and 49 denote servo amplifiers for driving the Z-axis servo motors 46 and 47, and numeral 50 denotes a numerical control (NC) for issuing a command to the servo amplifiers 48 and 49 and controlling the Z-axis servo motors 46 and 47.

The complex lathe in the related art is a lathe for working the workpiece 41 while synchronously operating the head stocks 44 and 45 with the workpiece 41 sandwiched at both ends between the face drivers 42 and 43 attached to the head stocks 44 and 45. At this time, the NC 50 performs torque constant synchronous control for synchronously operating the head stocks 44 and 45 with the workpiece 41 sandwiched therebetween at constant torque for at least either of the head stocks 44 and 45.

Figure 10:
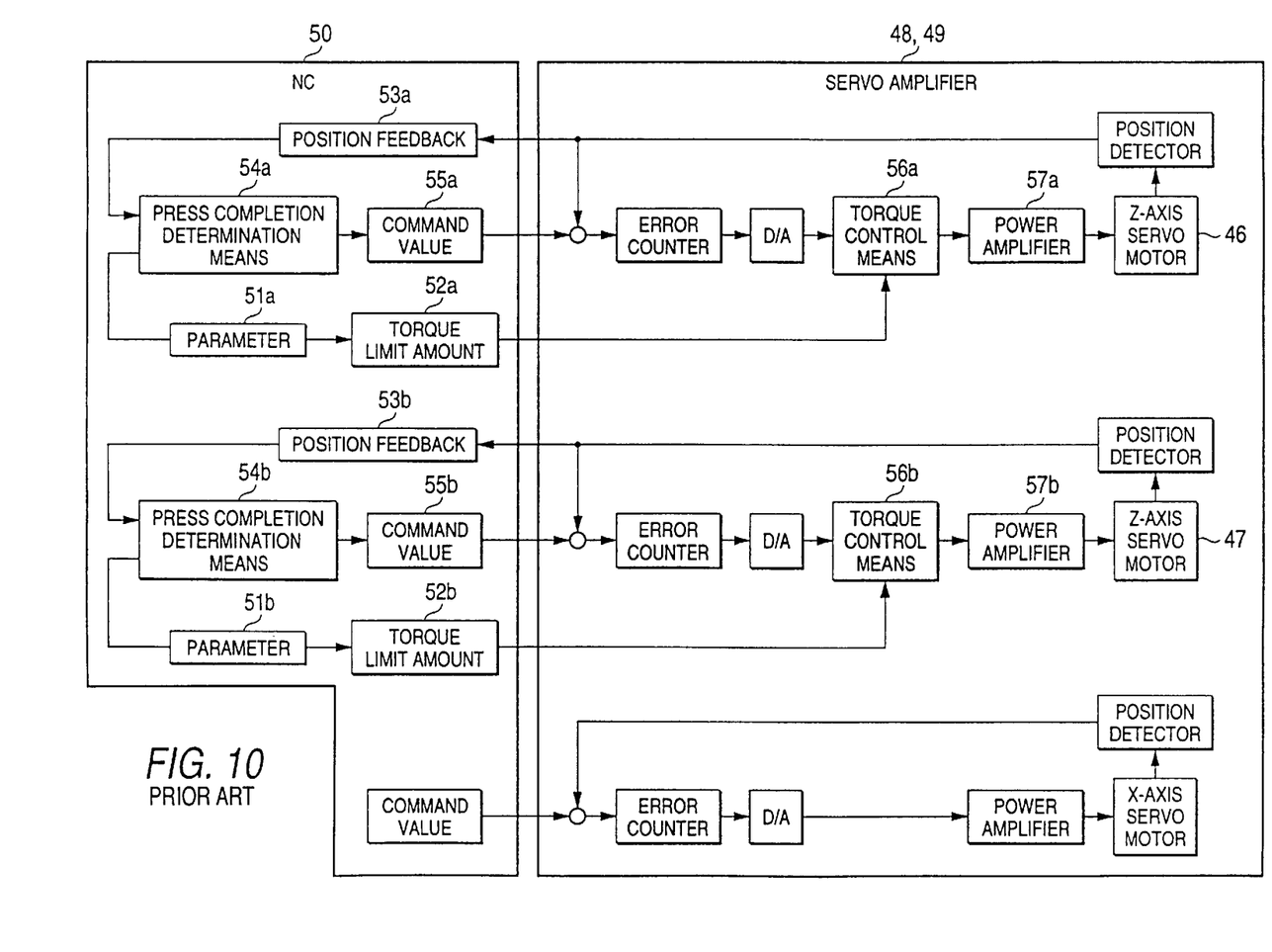
FIG. 10 is a block diagram of the complex lathe shown in FIG. 9.

FIG. 10 is a block diagram of the complex lathe shown in FIG. 9. In FIG. 10, numerals 48 and 49 denote the servo motors, numeral 50 denotes the NC, numerals 51a and 51b denote parameters for setting data required for computing axis move data, etc., numerals 52a and 52b denote torque limit amounts for determining the torque amounts of the Z-axis servo motors 46 and 47, numerals 53a and 53b denote position feedback of the Z-axis servo motors 46 and 47 for driving the head stocks 44 and 45, numerals 54a and 54b denote press completion determination means for determining the head stocks 44 and 45 pressing against the workpiece 41, numerals 55a and 55b denote position command values for moving the head stocks 44 and 45 toward the workpiece 41, numerals 56a and 56b denote torque control means for controlling torque based on the torque limit amounts 52a and 52b, and numerals 57a and 57b denote power amplifiers for driving the Z-axis servo motors 46 and 47.

In the complex lathe in the related art, to hold a workpiece, the head stocks 44 and 45 are moved toward the workpiece 41 and the face drivers 42 and 43 come in contact with the workpiece 41 and if it is made impossible to move the head stock 44, 45 and the error amount from the position command value is increased, the torque control means 56a, 56b cuts the torque to the torque limit amount 52a, 52b and outputs the cut torque to the power amplifier 57a, 57b, thereby performing torque constant control.

In a state in which the torque is output so as to become the torque limit amount 52a, 52b, when the press completion amount becomes less than (position command value 55a—position feedback 53a) or the press completion amount becomes less than (position command value 55b—position feedback 53b), the press completion determination means 54a, 54b determines the pressing to be complete, and stops increasing the position command value.

The complex lathe in the related art is a lathe for sandwiching the workpiece 41 between the head stocks 44 and 45 at constant torque for holding the workpiece 41 and working the workpiece 41 in the state as in the above-described sequence.

In the torque constant synchronous control system in the related art shown in FIG. 8, as a result of the torque control drive 39 pressing the material supply machine 36 against the workpiece 31 under constant load by performing torque constant control, the main control drive 35 and the torque control drive 39 are operated synchronously. Thus, the torque constant synchronous control system cannot be used in applications wherein the torque control drive 39 cannot follow the motion of the main control drive 35, for example, applications at the rapid acceleration or deceleration time or when excessive backlash exists because the workpiece 31 may fall out from the material supply machine 36 because of insufficient press load or may become deformed because of excessive press load; this is a problem of the torque constant synchronous control system.

To avoid torque instability of the press load caused by the fact that the torque control drive 39 cannot follow the motion of the main control drive 35, a method of performing only torque constant control at the stop time and inputting a position command as a synchronous pattern from an external control section and accomplishing synchronous operation under position control at the moving time may be adopted. However, any of the following:

a. backlash caused by the mechanical structure of the torque control drive 39, the material supply machine 36,     b. torque variation caused by position droop variation caused by a warp in the workpiece 31, etc., c. press load instability caused by counter force of synchronous shafts, d. position droop at the torque constant control time, or the like may induce mechanical vibration because of excessive output of a torque command at the position control switch time, and it is difficult to perform stable and high-accuracy synchronous control; this is a problem.

Further, in the complex lathe in the related art shown in FIGS. 9 and 10, torque constant control of pressing with the torque limit amount set is executed and acceleration/deceleration based on acceleration/deceleration torque larger than the setup torque limit amount at the torque constant synchronous control time cannot be executed, thus the complex lathe cannot be used in applications wherein rapid load variation exists; this is a problem.

SUMMARY OF THE INVENTION

The invention is intended for solving the problems as described above. It is a first object of the invention to provide a synchronous controller that can perform high-speed, high-accuracy torque constant control even in applications wherein rapid load variation exists.

It is a second object of the invention to provide a synchronous controller that can perform stable torque constant control insensitive to instability of a torque command caused by a position shift caused by a warp in a workpiece, backlash, etc.

It is a third object of the invention to provide a synchronous controller that can perform stable torque constant control insensitive to instability of a torque command caused by a position shift caused by a warp in a workpiece, backlash, etc., at the stop time.

It is a fourth object of the invention to provide a synchronous controller that can perform stable torque constant position control even at the move start time.

It is a fifth object of the invention to provide a synchronous controller that can perform stable torque constant control and torque constant position control and can perform stable and high-accuracy torque constant synchronous control at the stop time and the move time.

It is a sixth object of the invention to provide a synchronous controller that can switch from torque constant control to position control without receiving the effect of a position droop.

It is a seventh object of the invention to provide a synchronous controller that can perform stable torque constant control insensitive to a position shift caused by a warp in a workpiece, backlash, etc., at the torque constant control time.

It is an eighth object of the invention to provide a synchronous controller that can perform position management aside from error excess even at the torque constant control time.

In the synchronous controller according to the invention, the torque amount used for a control purpose of pressing a workpiece, etc., can be set as a torque offset correction amount and the torque offset correction amount is added to a torque command generated from a speed command and speed feedback generated from a position command and position feedback.

Torque command correction means for correcting variation in the torque command generated from the speed command and speed feedback generated from the position command and position feedback is also included.

Further, the torque command correction means comprises sampling means for sampling the torque command generated from the speed command and speed feedback generated from the position command and position feedback as a stop time torque command at the stop time at which the position command is zero, and subtracts the stop time torque command from the torque command generated from the speed command and speed feedback generated from the position command and position feedback.

The torque command correction means comprises hold means for holding the torque command generated from the speed command and speed feedback generated from the position command and position feedback as a stop time torque command at the moving time at which the position command is not zero, and subtracts the stop time torque command from the torque command generated from the speed command and speed feedback generated from the position command and position feedback at the move start time.

The torque command correction means comprises sampling means for sampling the torque command generated from the speed command and speed feedback generated from the position command and position feedback as a stop time torque command at the moving time at which the position command is not zero, hold means for holding the torque command generated from the speed command and speed feedback generated from the position command and position feedback as a stop time torque command at the stop time at which the position command is zero, and a stop/moving time determination switch circuit for switching the sampling means and the hold means, wherein if the position command is zero, connection is made to the sampling means and the stop time torque command is subtracted from the torque command generated from the speed command and speed feedback generated from the position command and position feedback and if the position command is not zero, connection is made to the hold means and the stop time torque command is subtracted from the torque command generated from the speed command and speed feedback generated from the position command and position feedback at the move start time.

The synchronous controller further includes a zero convergence circuit being placed at the stage following the hold means for continuously changing a predetermined value to zero, wherein the stop time torque command held by the hold means is subtracted from the torque command generated from the speed command and speed feedback generated from the position command and position feedback, and the stop time torque command is subtracted continuously to zero at the move start time.

The speed loop integration term of the speed control section is cleared to zero at the torque constant control time.

At the torque constant control time, aside from error excess, if the position droop at the stop time exceeds a predetermined value, a torque constant position control alarm or warning is output.

DETAILED DESCRIPTION OF THE PREFERRED EMBODIMENTS

Now, a description will be given in more detail of preferred embodiments with reference to the accompanying drawings.

(First Embodiment)

Figure 1:
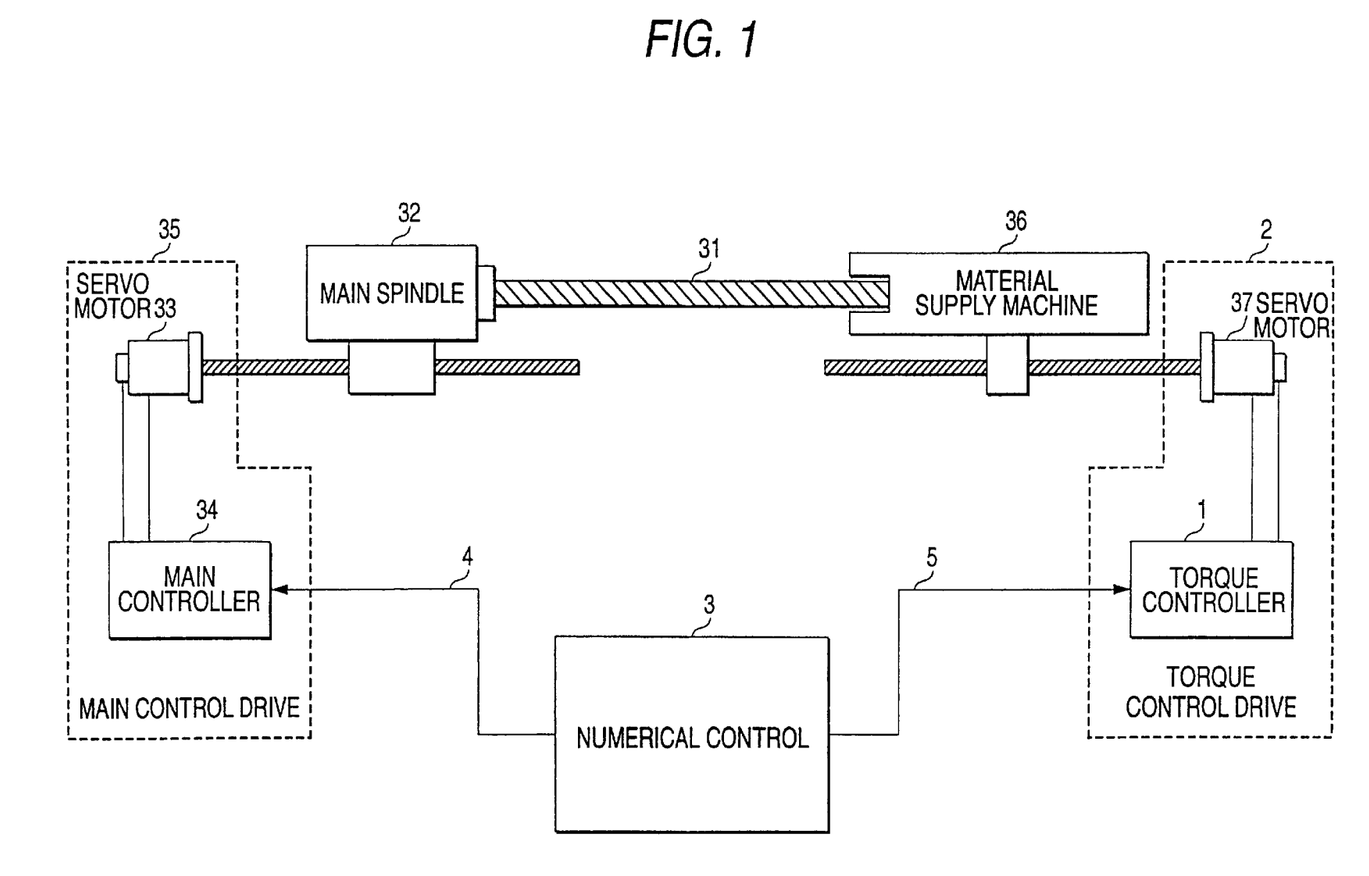
FIG. 1 is a diagram to show the configuration of a torque constant synchronous control system of one embodiment of the invention.

FIG. 1 is a diagram to show the configuration of a torque constant synchronous control system of one embodiment of the invention. In the figure, parts denoted by numerals 31 to 37 are similar to those previously described with reference to FIG. 8 in the above-described related art example and will not be discussed again. Numeral 1 denotes a torque controller as a synchronous controller, numeral 2 denotes a torque control drive for controlling a torque control servo motor 37 at constant torque so as to enable a material supply machine 36 to give a constant load to workpiece 31, and numeral 3 denotes a numerical control for outputting position commands 4 and 5 as synchronous operation patterns to a main control drive 35 and the torque control drive 2 and performing torque constant synchronous control.

Figure 2:
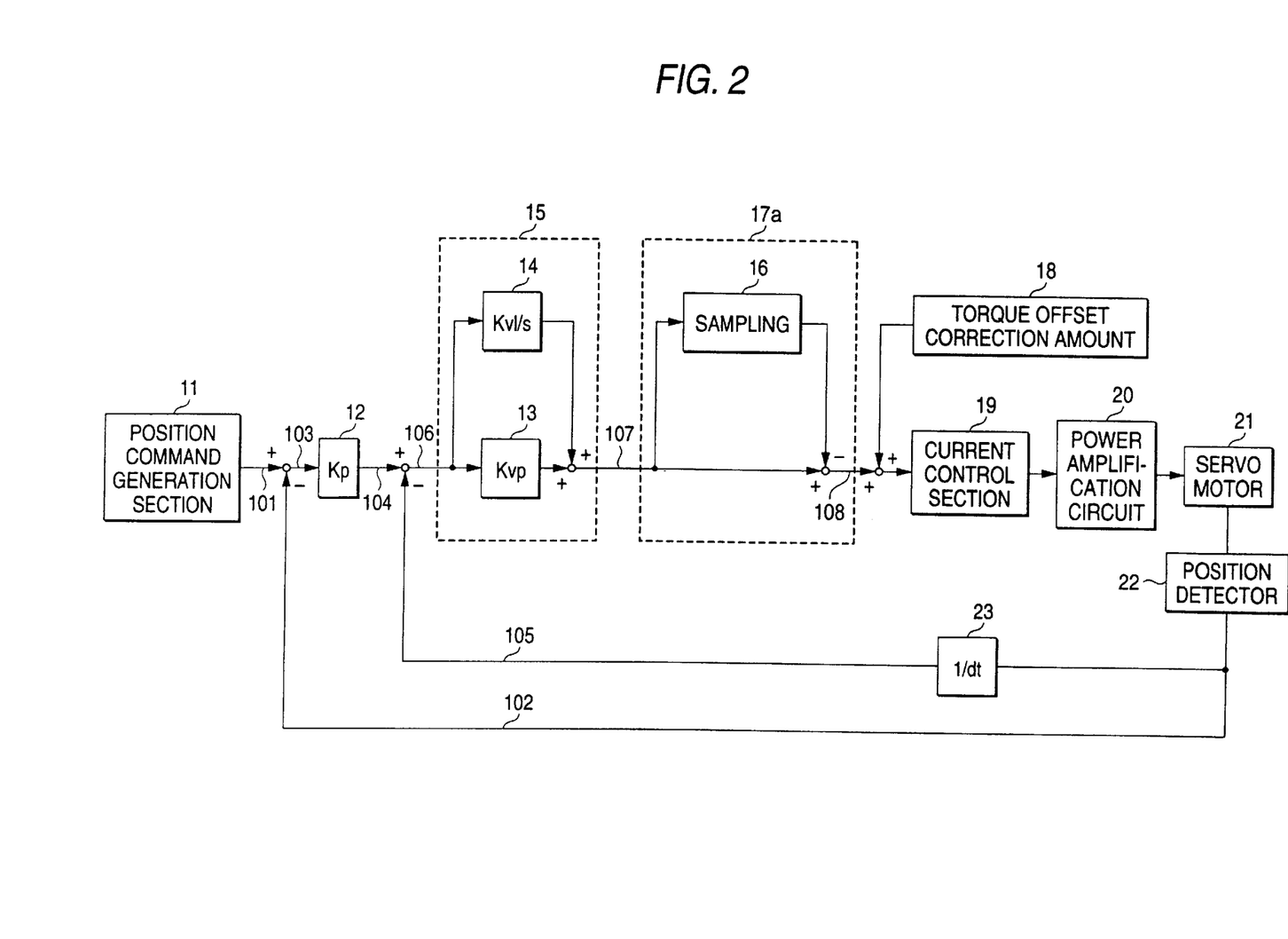
FIG. 2 is a block diagram of a torque control drive in the torque constant synchronous control system of the embodiment of the invention.

FIG. 2 is a block diagram of the torque control drive in the torque constant synchronous control system of the embodiment of the invention. In the figure, numeral 11 denotes a position command generation section, numeral 12 denotes a position loop gain Kp, numeral 13 denotes a speed loop gain Kvp, numeral 14 denotes a speed loop integration term, numeral 15 denotes a speed control section consisting of the speed loop gain Kvp 13 and the speed loop integration term 14, numeral 16 denotes a sampling circuit as sampling means, numeral 17a denotes a torque command correction circuit, numeral 18 denotes a torque offset correction amount as a torque amount required for pressing the material supply machine 36 against the workpiece 31 under constant load, numeral 19 denotes a current control section, numeral 20 denotes a power amplification circuit, numeral 21 denotes a servo motor, numeral 22 denotes a position detector, numeral 23 denotes a differentiator, and Kv1 denotes a speed loop integration gain.

Numeral 101 denotes a position command output from the position command generation section 11, numeral 102 denotes position feedback, numeral 103 denotes a position droop prepared from the position command 101 and the position feedback 102, numeral 104 denotes a speed command, numeral 105 denotes speed feedback, numeral 106 denotes a speed deviation signal generated from the position command 104 and the position feedback 105, numeral 107 denotes a torque command, and numeral 108 denotes a post-corrected torque command.

Normal position control is performed in the sequence of (1) subtracting the position feedback 102 from the position command 101 output from the position command generation section 11 for preparing the position droop 103 and when the position droop 103 is prepared, if the number of accumulated pulses of a deviation counter provided by subtracting the position feedback 102 from the position command 101 becomes equal to or greater than a predetermined value (generally about several mm), producing an error excess alarm;

(2) generating the speed command 104 based on the position droop 103 with a position loop gain Kp12;

(3) subtracting the speed feedback 105 from the speed command 104 for generating the speed deviation signal 106;

(4) generating the torque command 107 based on the speed deviation signal 106 by the speed control section 15;

(5) generating a voltage command based on the torque command 107 of the current control section 19 and converting the command into power of a type appropriate for controlling a motor based on the voltage command by the power amplification circuit 20; and (6) driving the servo motor 21 using the power generated at the above described step.

To drive the servo motor 21, output current is fed back on a current loop (not shown) and motor output torque is controlled to a level of an internal clamp value or less by the current control section 19.

Next, the operation of the torque control drive in the embodiment will be discussed.

The speed control section 15 for generating the torque command 107 based on the speed deviation signal 106 clears the speed loop integration term 14 to zero at the torque constant control time, thereby preventing position droop variation from causing an excessive increase in the speed loop integration term 14.

In the normal position control, if the position feedback 102 is changed because of a warp in a workpiece, various machine displacements, or thermal displacement even at the stop time at which the position command 101 output from the position command generation section 11 is zero, the position droop 103 does not become zero and the torque command 107 is generated.

At the stop time, the torque command correction circuit 17a in the embodiment subtracts the torque command 107 sampled by the sampling circuit 16 from the torque command 107 to generate the post-corrected torque command 108, thereby canceling the torque command 107 found in response to variation in the position droop 103.

In the torque control drive in the embodiment, it is made possible to set the torque offset correction amount 18 as the torque amount required for pressing the material supply machine 36 against the workpiece 31 under constant load, and the torque offset correction amount 18 is added to the post-corrected torque command 108 found from the position command 101, etc.

At the torque constant control time, error excess determination as a protection function in the normal position control cannot be used, but a predetermined value for torque constant control (generally, about several cm) larger than a predetermined value for error excess determination (generally, about several mm) is used in place of error excess determination and the position command 101, the position feedback 102, and the position droop 103 are managed and if the position droop at the stop time is larger than the predetermined value for torque constant control, a position torque constant control alarm or warning is output, whereby protection can also be provided if the torque control drive cannot follow the motion of the main control drive at the rapid acceleration or deceleration time or because of excessive backlash, etc.

In FIG. 1 to show the configuration of the torque constant synchronous control system described above, the main spindle 32 and the material supply machine 36 are replaced with head stocks 44 and 45, which can be used with a complex lathe.

(Second Embodiment)

Figure 3:
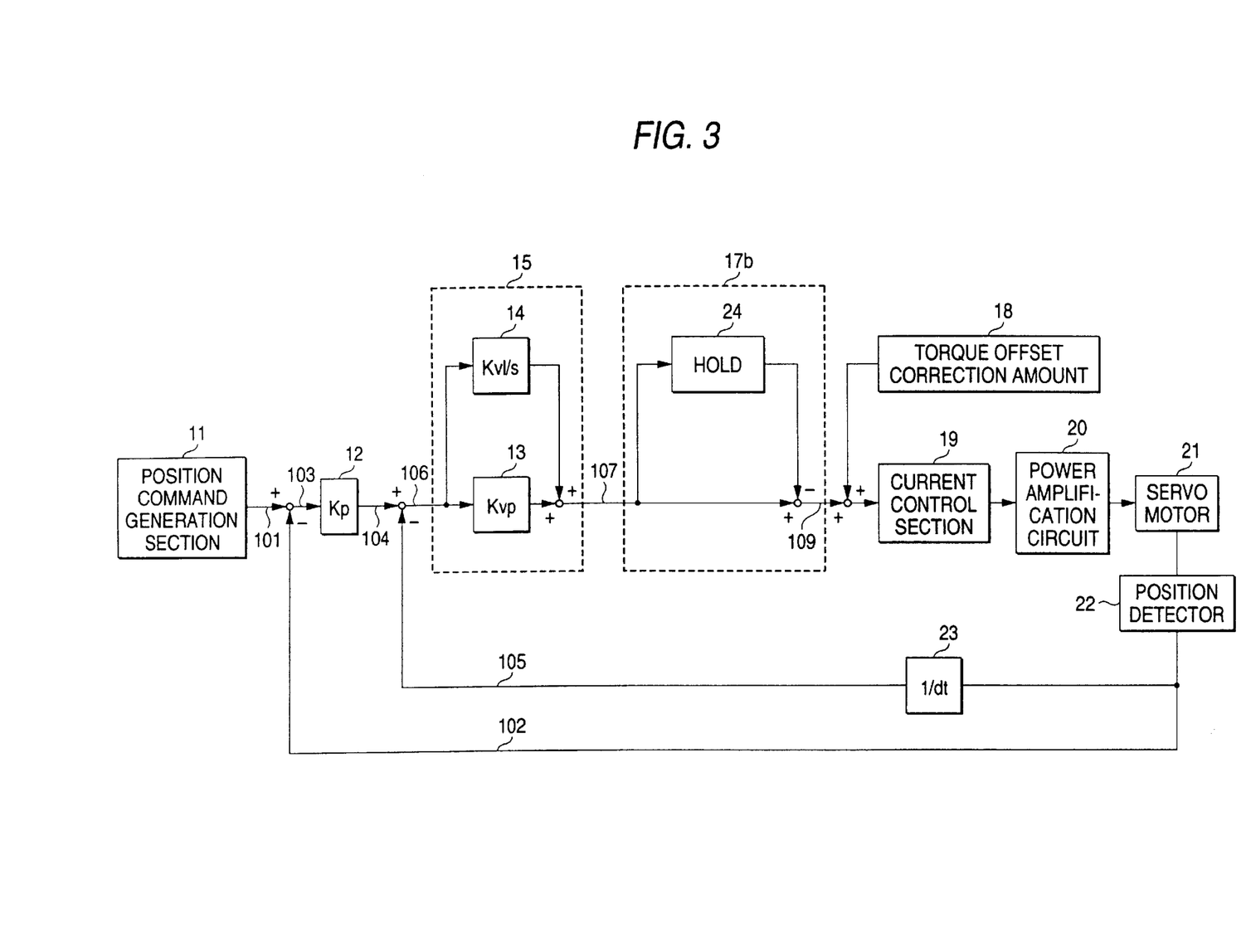
FIG. 3 is a block diagram of a torque control drive according to one embodiment of the invention.

FIG. 3 is a block diagram of a torque control drive according to one embodiment of the invention. In the figure, parts denoted by numerals and symbols 11 to 15, 18 to 23, Kp, Kvp, Kv1, and 101 to 107 are similar to those previously described with reference to FIG. 2 and will not be discussed again. Numeral 17b denotes a torque command correction circuit, numeral 24 denotes a hold circuit as hold means, and numeral 109 denotes a post-corrected torque command.

Next, the operation of the torque control drive in the embodiment will be discussed.

At the stop time of torque constant control, if a position command 101 is zero, a warp in a workpiece, etc., becomes position feedback 102 and a position droop 103 may occur.

At the move start time, if a torque command corresponding to the position droop at the stop time is added to the acceleration torque required for acceleration calculated based on the position command 101, a control force to sweep out the position droop at the stop time works momentarily, and an abnormal load on a workpiece may occur or mechanical vibration may be induced.

When the position command 101 is not zero (at the moving time), the torque command correction circuit 17b in the embodiment holds a torque command 107 at the move start time just after the move command 101 is received from a position command generation section 11 in the hold circuit 24 and subtracts the held torque command value (torque command value generated from the position droop at the stop time) from the torque command 107 to generate the post-corrected torque command 109.

(Third Embodiment)

Figure 4:
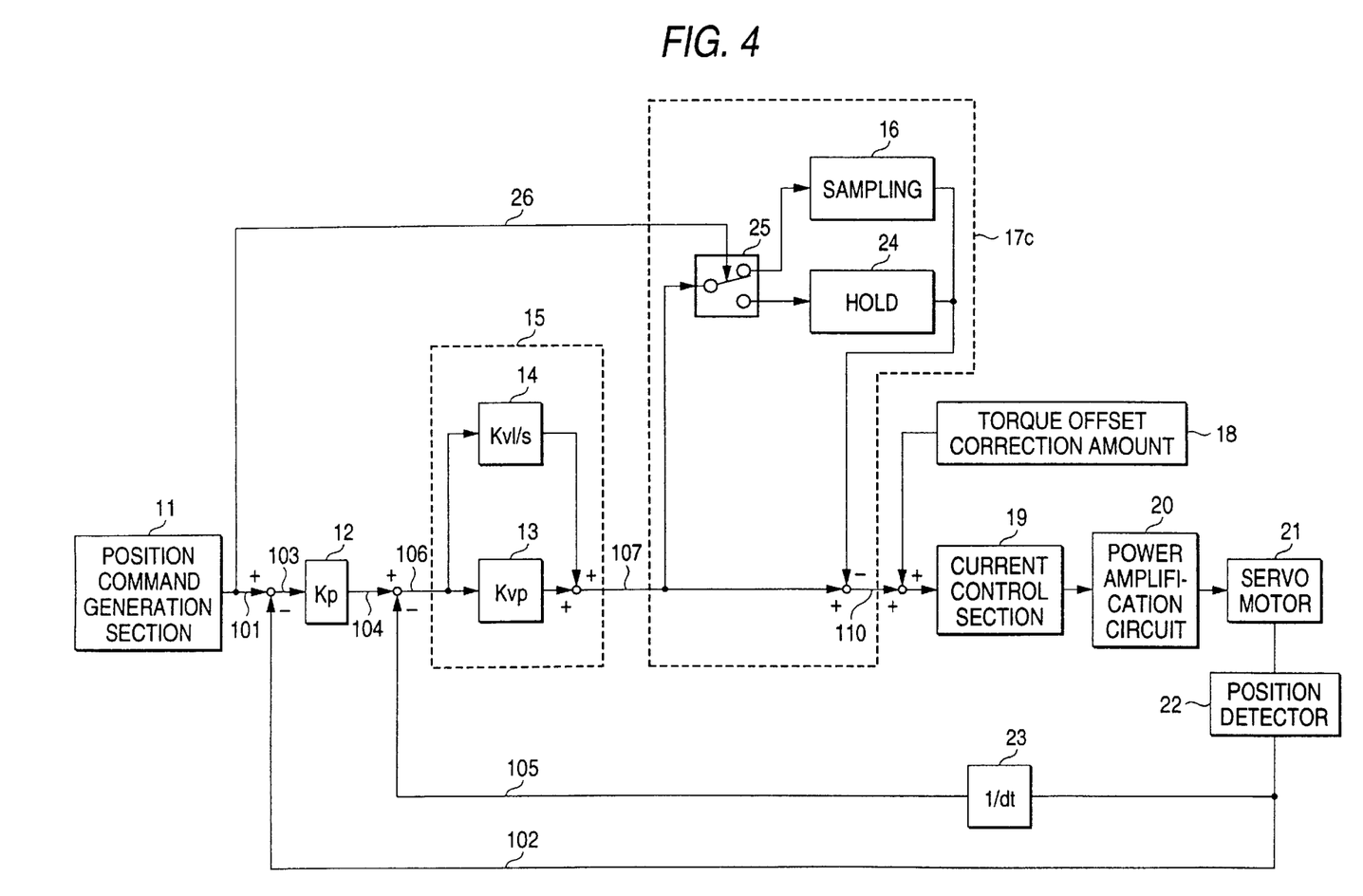
FIG. 4 is a block diagram of a torque control drive according to one embodiment of the invention.

FIG. 4 is a block diagram of a torque control drive according to one embodiment of the invention. In the figure, parts denoted by numerals and symbols 11 to 16, 18 to 23, Kp, Kvp, Kv1, and 101 to 107 are similar to those previously described with reference to FIG. 2 and will not be discussed again. Numeral 17c denotes a torque command correction circuit, numeral 24 denotes a hold circuit as hold means, numeral 25 denotes a stop/moving time determination switch circuit, numeral 26 denotes input means of a position command as a synchronous operation pattern, and numeral 110 denotes a post-corrected torque command.

The torque command correction circuit 17c in the embodiment comprises the stop/moving time determination switch circuit 25 for connecting a self torque command correction method to a sampling circuit 16 at the stop time at which the position command is zero and the hold circuit 24 at the moving time at which the position command 101 is not zero according to the input means of the position command as a synchronous operation pattern.

Figure 5:
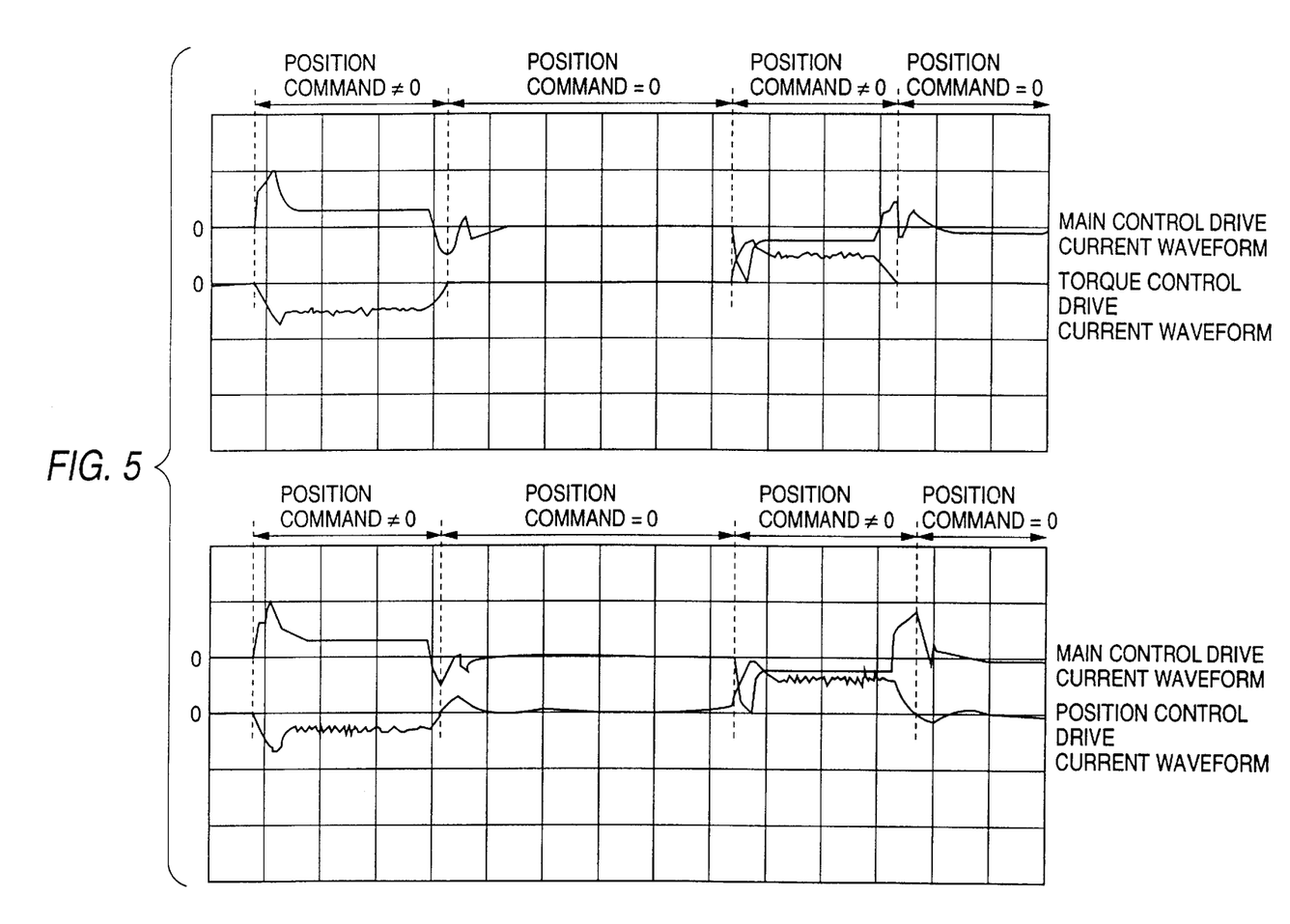
FIG. 5 is a drawing to show current waveforms of the torque control drive according to the embodiment of the invention and a main control drive.

FIG. 5 is a drawing to show current waveforms of the torque control drive according to the embodiment of the invention and a main control drive when the position command as a synchronous operation pattern is input through the input means 26 from a position command generation section 11 and whether the position command is zero or not zero is determined and connection is switched by the stop/moving time determination switch circuit 11 of the torque command correction circuit 17c for executing torque constant position control.

(Fourth Embodiment)

Figure 6:
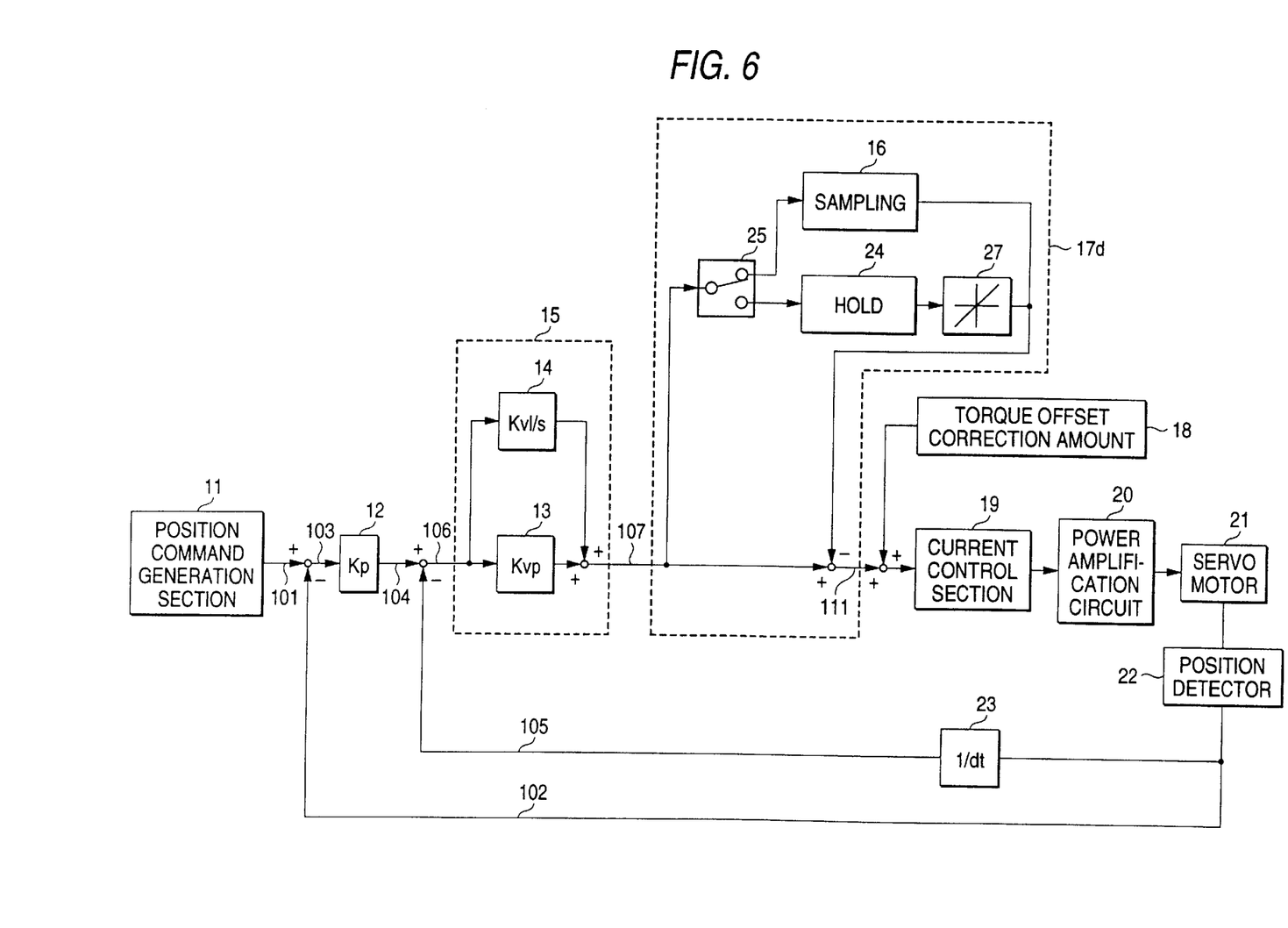
FIG. 6 is a block diagram of a torque control drive according to one embodiment of the invention.

FIG. 6 is a block diagram of a torque control drive according to one embodiment of the invention. In the figure, parts denoted by numerals and symbols 11 to 16, 18 to 23, Kp, Kvp, Kv1, and 101 to 107 are similar to those previously described with reference to FIG. 2 and will not be discussed again. Numeral 17d denotes a torque command correction circuit, numeral 24 denotes a hold circuit as hold means, numeral 25 denotes a stop/moving time determination switch circuit, numeral 27 denotes a zero convergence circuit, and numeral 111 denotes a post-corrected torque command.

Figure 7:
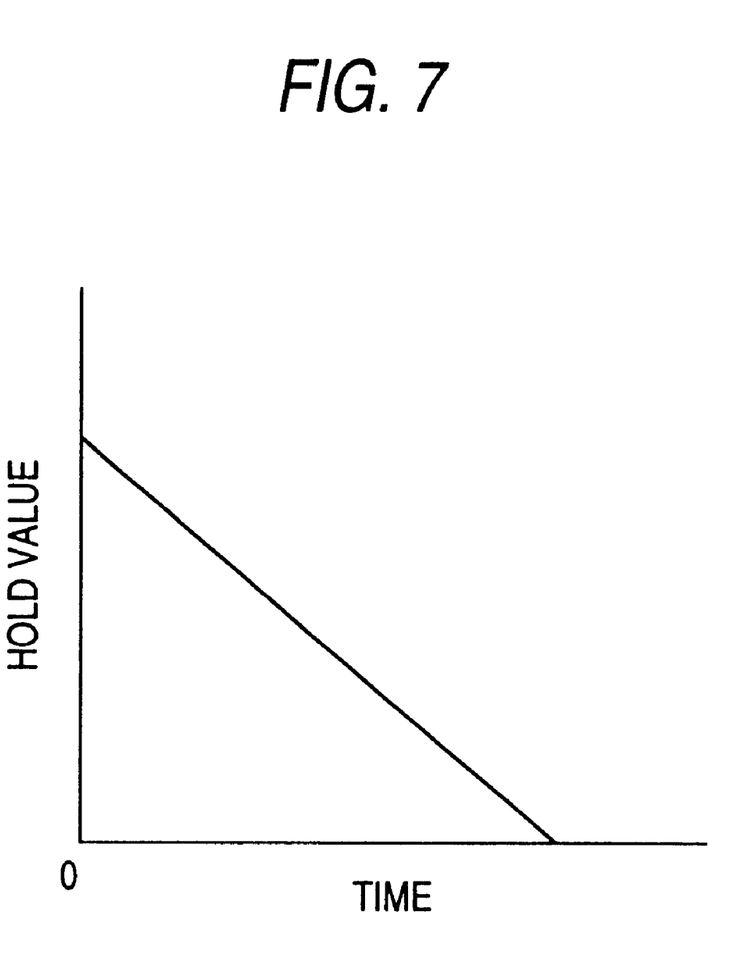
FIG. 7 is a zero convergence drawing of a command torque hold signal in a zero convergence circuit 27 according to the embodiment of the invention.

FIG. 7 is a zero convergence drawing of a command torque hold signal in the zero convergence circuit 27 according to the embodiment of the invention.

Next, the operation of the torque control drive in the embodiment will be discussed.

(1) When torque constant control is off, the torque command correction switch circuit 25 is placed in a sample mode and a torque command 107 generated from a position droop is canceled and in this state, an arbitrarily specified torque offset correction amount 18 is set to zero.

Thus, the production of mechanical vibration caused by the fact that change in the position droop caused by setting the torque offset correction amount 18 to zero leads to abrupt variation in the torque command 107 is avoided.

(2) Then, the torque command correction switch circuit 25 is switched from the sample mode to a hold mode and a hold value is set smoothly to zero by a simple function, for example, continuous and proportional changing to zero is performed, as shown in FIG. 7, by the zero convergence circuit 27, whereby the torque command 107 is restored gently to the torque command equivalent to a position droop 103 and mechanical vibration caused by abrupt change in the torque command 107 occurring when the hold value is reset directly to zero is avoided.

In the above-given description, the example in which the torque control drive 2 is provided with the position command generation section 11 is shown; however, if the numerical control 3 is provided with the position command generation section 11 for preparing the position droop 103 in the numerical control 3, a similar advantage can be provided.

Since the invention is configured as described above, it provides the following advantages:

In the synchronous controller according to the invention, the torque amount used for a control purpose of pressing a workpiece, etc., can be set as a torque offset correction amount and the torque offset correction amount is added to a torque command generated from a speed command and speed feedback generated from a position command and position feedback. Thus, the torque amount used for the control purpose of pressing a workpiece, etc., can be controlled separately from acceleration/deceleration torque required for synchronous operation and high-speed, high-accuracy torque constant synchronous control can also be executed if rapid load variation such as torque constant synchronous operation with another drive controller occurs.

The torque command correction means for correcting variation in the torque command generated from the speed command and speed feedback generated from the position command and position feedback is also included. Thus, stable arbitrary torque constant control insensitive to instability of the torque command caused by a position shift or position droop variation caused by a warp in a workpiece, backlash, etc., at the stop time can be performed.

Further, the torque command correction means comprises sampling means for sampling the torque command generated from the speed command and speed feedback generated from the position command and position feedback as a stop time torque command at the stop time at which the position command is zero, and subtracts the stop time torque command from the torque command generated from the speed command and speed feedback generated from the position command and position feedback. Thus, stable arbitrary torque constant control insensitive to instability of the torque command caused by a position shift or position droop variation caused by a warp in a workpiece, backlash, etc., at the stop time can be performed.

The torque command correction means comprises hold means for holding the torque command generated from the speed command and speed feedback generated from the position command and position feedback as a stop time torque command at the moving time at which the position command is not zero, and subtracts the stop time torque command from the torque command generated from the speed command and speed feedback generated from the position command and position feedback at the move start time. Thus, it is made possible to execute stable torque constant position control based on proper acceleration/deceleration torque command and torque offset correction amount corresponding to the increment or decrement of the position droop from the move start time in a state in which the torque command generated from the position droop at the move start time is canceled.

The torque command correction means comprises sampling means for sampling the torque command generated from the speed command and speed feedback generated from the position command and position feedback as a stop time torque command at the moving time at which the position command is not zero, hold means for holding the torque command generated from the speed command and speed feedback generated from the position command and position feedback as a stop time torque command at the stop time at which the position command is zero, and a stop/moving time determination switch circuit for switching the sampling means and the hold means, wherein if the position command is zero, connection is made to the sampling means and the stop time torque command is subtracted from the torque command generated from the speed command and speed feedback generated from the position command and position feedback and if the position command is not zero, connection is made to the hold means and the stop time torque command is subtracted from the torque command generated from the speed command and speed feedback generated from the position command and position feedback at the move start time. Thus, it is made possible to execute stable and high-accuracy torque constant synchronous control based on torque constant control insensitive to the position droop size or variation at the stop time and torque constant position control insensitive to the position droop size at the move start time at the move time as the position command is changed.

The synchronous controller further includes a zero convergence circuit being placed at the stage following the hold means for continuously changing a predetermined value to zero, wherein the stop time torque command held by the hold means is subtracted from the torque command generated from the speed command and speed feedback generated from the position command and position feedback, and the stop time torque command is subtracted continuously to zero at the move start time. Thus, at the switching time from the torque constant control to the position control, the position droop accumulated in the torque constant control can be gently swept out and the transition to the normal position control can be made without giving abrupt torque change to the machine.

The speed loop integration term of the speed control section is cleared to zero at the torque constant control time. Thus, stable torque constant control insensitive to a position shift caused by a warp in a workpiece, backlash, etc., at the torque constant control time can be performed.

At the torque constant control time, a predetermined value for torque constant control (generally, about several cm) larger than a predetermined value for error excess determination (generally, about several mm) is used in place of error excess and if the position droop at the stop time is larger than the predetermined value for torque constant control, a torque constant control alarm or warning is output. Thus, if the torque control drive cannot follow the motion of the main control drive at the rapid acceleration or deceleration time or because of excessive backlash, etc., the machine can be stopped before a workpiece falls out from the material supply machine because of instable press load against the workpiece and insufficient press load or becomes deformed because of excessive press load.

As described above, the synchronous controller according to the invention is appropriate for controlling a servo motor for driving a robot, a machine tool, etc., as constant torque.

FIG. 1
2 TORQUE CONTROL DRIVE
3 NUMERICAL CONTROL
32 MAIN SPINDLE
35 MAIN CONTROL DRIVE
FIG. 2
11 POSITION COMMAND GENERATION SECTION
16 SAMPLING
18 TORQUE OFFSET CORRECTION AMOUNT
19 CURRENT CONTROL SECTION
20 POWER AMPLIFICATION CIRCUIT
21 SERVO MOTOR
22 POSITION DETECTOR
FIG. 3
11 POSITION COMMAND GENERATION SECTION
18 TORQUE OFFSET CORRECTION AMOUNT
19 CURRENT CONTROL SECTION
20 POWER AMPLIFICATION CIRCUIT
21 SERVO MOTOR
22 POSITION DETECTOR
24 HOLD
FIG. 4
11 POSITION COMMAND GENERATION SECTION
16 SAMPLING
18 TORQUE OFFSET CORRECTION AMOUNT
19 CURRENT CONTROL SECTION
20 POWER AMPLIFICATION CIRCUIT
21 SERVO MOTOR
22 POSITION DETECTOR
24 HOLD
FIG. 5
A. POSITION COMMAND≠0
B. POSITION COMMAND=0
C. MAIN CONTROL DRIVE
    CURRENT WAVEFORM

TORQUE CONTROL DRIVE
CURRENT WAVEFORM
D. MAIN CONTROL DRIVE
CURRENT WAVEFORM
POSITION CONTROL DRIVE
CURRENT WAVEFORM
FIG. 6
11 POSITION COMMAND GENERATION SECTION
16 SAMPLING
18 TORQUE OFFSET CORRECTION AMOUNT
19 CURRENT CONTROL SECTION
20 POWER AMPLIFICATION CIRCUIT
21 SERVO MOTOR
22 POSITION DETECTOR
24 HOLD
FIG. 7
HOLD VALUE
FIG. 8
32 MAIN SPINDLE
35 MAIN CONTROL DRIVE
36 MATERIAL SUPPLY MACHINE
39 TORQUE CONTROL DRIVE
40 NUMERICAL CONTROL
44 HEAD STOCK
46 Z AXIS
47 Z AXIS
48 SERVO AMPLIFIER
49 HEAD STOCK
49 SERVO AMPLIFIER
50 NUMERICAL CONTROL
A. Z1 AXIS
B. Z2 AXIS
FIG. 10
46 Z-AXIS SERVO MOTOR
47 Z-AXIS SERVO MOTOR
48, 49 SERVO AMPLIFIER
51a PARAMETER
51b PARAMETER
52a TORQUE LIMIT AMOUNT
52b TORQUE LIMIT AMOUNT
53a POSITION FEEDBACK
53b POSITION FEEDBACK
54a PRESS COMPLETION DETERMINATION MEANS
54b PRESS COMPLETION DETERMINATION MEANS
55a COMMAND VALUE
55b COMMAND VALUE
56a TORQUE CONTROL MEANS
56b TORQUE CONTROL MEANS
57a POWER AMPLIFIER
57b POWER AMPLIFIER
A. POSITION DETECTOR
B. ERROR COUNTER
C. X-AXIS SERVO MOTOR

What is claimed is:

1. A synchronous controller comprising:
a speed control section for generating a torque command based on a speed command and a speed feedback value derived from a position command and a position feedback value, said speed control section being placed on a second main shaft side of a torque constant control system,
wherein a first main shaft side of said torque constant control system fixes one side of a workpiece and controls rotation and the second main shaft side presses and holds an opposite side of the workpiece, and
wherein a torque amount used to control the pressing of the workpiece is set as a torque offset correction amount, and the torque offset correction amount is added to the torque command.

2. The synchronous controller according to claim 1, further comprising a torque command correction means for correcting variation in the torque command at a stage preceding addition of the torque offset correction amount.

3. The synchronous controller according to claim 2, wherein the torque command correction means comprises sampling means for sampling the torque command as a stop time torque command at the stop time at which the position command is zero, and subtracting the stop time torque command from the torque command.

4. The synchronous controller according to claim 2, wherein the torque command correction means comprises hold means for holding as a stop time torque command the torque command generated at a move start time just after reception of a move command at which the position command is not zero, and subtracting the stop time torque command from the torque command at the move start time.

5. The synchronous controller according to claim 2, wherein the torque command correction means comprises:
sampling means for sampling the torque command as a stop time torque command at the stop time at which the position command is zero;
hold means for holding as a stop time torque command the torque command generated at a move start time just after reception of a move command at which the position command is not zero; and
a stop/move time determination switch circuit for switching the sampling means and the hold means, wherein if the position command is zero, connection is made to the sampling means and the sampled stop time torque command is subtracted from the torque command in order to set the torque command output from the torque command correction means to zero, and if the position command is not zero, connection is made to the hold means and the held stop time torque command is subtracted from the torque command at the move start time.

6. The synchronous controller according to claim 5, wherein the torque command correction means further comprises a zero convergence circuit for continuously changing a predetermined value to zero, said zero convergence circuit being placed at a stage following the hold means, wherein when change is made from torque constant control to position control, the torque offset correction amount is set to zero, change is made from the sampling means side to the hold means side, and the stop time torque command held by the hold means is subtracted continuously to zero.

7. The synchronous controller according to claim 1, whereby servo motor position control and torque control are performed based on the torque command.

* * * * *